United States Patent
Ziauddin et al.

(10) Patent No.: US 7,912,123 B2
(45) Date of Patent: Mar. 22, 2011

(54) METHOD AND SYSTEM FOR PROVIDING LOW COST ROBUST OPERATIONAL CONTROL OF VIDEO ENCODERS

(75) Inventors: Syed Muhammad Ziauddin, Islamabad (PK); Imran ul-Haq, Islamabad (PK); Muhammad Nadeem, Islamabad (PK); Muhammad Shafique, Islamabad (PK)

(73) Assignee: Streaming Networks (Pvt.) Ltd, Islamabad (PK)

( * ) Notice: Subject to any disclaimer, the term of this patent is extended or adjusted under 35 U.S.C. 154(b) by 1412 days.

(21) Appl. No.: 11/366,320

(22) Filed: Mar. 1, 2006

(65) Prior Publication Data

US 2007/0206674 A1 Sep. 6, 2007

(51) Int. Cl.
*H04N 7/12* (2006.01)
(52) U.S. Cl. .................................. 375/240.05
(58) Field of Classification Search ............. 375/240.05, 375/240.01, 240.06, 240.16, 240.27; 382/326, 382/238, 239
See application file for complete search history.

(56) References Cited

U.S. PATENT DOCUMENTS

| | | | |
|---|---|---|---|
| 5,990,957 A | 11/1999 | Ryoo | |
| 6,674,797 B1 * | 1/2004 | Golin | 375/240.01 |
| 2002/0090027 A1 * | 7/2002 | Karczewicz et al. | 375/240.01 |
| 2004/0114817 A1 | 6/2004 | Jayant et al. | |
| 2006/0233237 A1 * | 10/2006 | Lu et al. | 375/240.03 |
| 2007/0286281 A1 * | 12/2007 | Tsuchiya et al. | 375/240.14 |

FOREIGN PATENT DOCUMENTS

WO 01/56298 A 8/2001

OTHER PUBLICATIONS

Yu Sun et al.; "A Rate Control Algorithm for Wireless Video Transmission Using Perceptual Tuning"; Information Technology: Coding and Computing, 2005. ITCC 2005; International Conference on Las Vegas, NV, USA Apr. 4-6, 2005, Piscataway, NJ, USA, IEEE, Apr. 4, 2005, pp. 109-114.
Chih-Wah Wong et al; "PID-Based Real-Time Rate Control"; Multimedia and Expo 2004, ICME '04; 2004 IEEE International Conference on Taipei, Taiwan Jun. 27-30, 2004, Piscataway, NJ, USA, IEEE, vol. 1, Jun. 27, 2004, pp. 221-224.
Streaming Networks (PVT) LTD.; PCT/US2007/063046 Filed Mar. 1, 2007, International Search Report, ISA/EP Aug. 18, 2007, 3pp.
ISO/IEC AD HOC Group on MPEG-4 Video VM Editing: "MPEG-4 Video Verification Model Version 8.0 ISO/IEC JTC1/SC29/WG11 MPEG97/N1796"; ISO/IEC JTC1/SC29/WG11 MPEG97/N1796, XX, XX, Jul. 1997, pp. 1-283.
Streaming Networks (PVT) LTD.; PCT/US2007/063046 Filed Mar. 1, 2007, International Preliminary Report on Patentability, International Bureau of WIPO, Sep. 2, 2008, 8pp.

* cited by examiner

*Primary Examiner* — Khai Tran
(74) *Attorney, Agent, or Firm* — SNR Denton US LLP (57) ABSTRACT

The present invention discloses a simple low cost framework for robust operational control of video encoders. The framework comprises a two-layer architecture that effectively decouples the processes of video bit rate control and video quality/distortion control. The upper layer includes a video bit rate controller that operates on a single picture/picture-slice, or a set of pictures/picture-slices, and is based on feedback control techniques used in automatic control systems. The lower layer includes a video quality/distortion controller that operates at the level of blocks of pixels, and reduces distortion artifacts. The decoupled nature of the encoder control architecture of the present invention provides the flexibility of combining various feedback control algorithms and various distortion reduction schemes.

19 Claims, 7 Drawing Sheets

Brightness

$B_{blk}$ ⇒ Average brightness of pixel block $nB_{ThB}$ ⇒ Number of blocks with average brightness below a brightness threshold

Variance

$\overline{V}_{picture(s)\,/\,slice(s)}$ ⇒ Average of the variance of pixel blocks in picture(s) / slice(s)

$V_{blk}$ ⇒ Variance of a pixel block

Distortion

$\overline{SAD}_{picture(s)\,/\,slice(s)}$ ⇒ Average SAD of picture(s) / slice(s) as given by the motion estimator $SAD_{blk}$ ⇒ SAD of a pixel block as given by the motion estimator $SAD_{blk}^{t}\big|_{t=-1,-2,\cdots,-k}$ ⇒ SAD of a pixel block that is co-located to a given pixel block, in one of the k preceding successive images $SAD_{blk}^{n}\big|_{n=1,2,\cdots,i}$ ⇒ SAD of a pixel block in the immediate neighborhood of a given pixel block

Activity

$SAD0_{blk}^{t}\big|_{t=0,-1,-2,\cdots,-k}$ ⇒ Zero motion vector SAD of a pixel block that is co-located to a given pixel block, in one of the k preceding successive images

Quantizer

$Q_{picture(s)\,/\,slice(s)}$ ⇒ Quantizer of picture(s) / slice(s)

Buffer State

BF ⇒ Buffer fullness

METHOD AND SYSTEM FOR PROVIDING LOW COST ROBUST OPERATIONAL CONTROL OF VIDEO ENCODERS

BACKGROUND

1. Field

The present invention relates generally to video processing, and more specifically, to methods and systems for providing efficient control of bit rate and quality in video encoders.

2. Background

The development of an efficient encoder control mechanism is a key issue in video coding. The goal of a typical encoder control mechanism is to generate compressed streams at the given target bit rates with minimum distortion.

Internationally adopted video coding standards (such as, MPEG1, MPEG2, MPEG4, H.263, and H.264 etc.) are based on the hybrid coding architecture. These standards reduce the temporal and spatial redundancies in the video data through motion compensated predictions and transformations, and employ entropy-coding techniques to achieve high compression ratios. The normative specifications of video coding standards provide the bit-stream syntax and the video decoding process to enable interoperability. Apart from the interoperability aspects, the video encoding process in general falls outside the scope of the standardization process. In this respect, the encoder control algorithm and the motion estimation process are the two most important components where the designers of video encoders have the flexibility to apply their ingenuity and come up with low cost and efficient solutions. The coding efficiency and computational load of a video encoder is primarily dependent upon the effectiveness of its operational control algorithm and its motion estimation strategy.

Most video encoding applications require video sequences to be encoded at a prescribed rate with minimum possible distortion. The rate-distortion efficiency of a video encoder largely depends upon its operational control algorithm. The control algorithm has to adjust the numerous coding parameters in a video encoder so as to maximize its coding efficiency, without violating the bit rate limits. The control algorithm is responsible for, amongst other things, dynamically selecting the optimum quantization parameters, picture types, pixel block modes, and pixel block partitions. Problems concerning the control algorithm are made complex by the intricate interaction between the widely varying content and motion in typical video sequences, and by the spatial and temporal dependencies between the different coding parameters. These problems are further compounded by the non-linear sensitivity of the human visual system (HVS) to distortions of different types.

The issue of encoder control became more significant with the arrival of the new H.264/AVC (ISO/IEC 14496-10) video coding standard, since such standard offers much more coding options compared with the previous standards. The H.264/AVC standard delivers much higher compression efficiency compared to the earlier standards. However, this higher compression efficiency comes at the cost of much higher computational complexity. The encoder has to select between numerous Inter and Intra macroblock prediction modes to obtain the optimum encoding mode. Such selection is a critical and time-consuming step, and the impressive bit rate reduction of H.264/AVC largely depends on it.

In the H.264/AVC reference encoder software, the selection of the optimum encoding mode is done by an algorithm known as rate-distortion optimization. The basic idea behind such algorithm is to minimize the distortion (D) subject to a constant rate (R), or to minimize R subject to a fixed D. Rate distortion optimization solves this problem by introducing a Lagrange multiplier $\lambda$ to convert the constrained optimization problem into an unconstrained optimization problem, and minimizing the Lagrangian function $D+\lambda R$. An ideal full scale optimization search for each picture and coding mode would be prohibitively large and resource intensive. In practice, preliminary experiments are performed using a large number of Lagrange multiplier values to determine approximate relationships between $\lambda$ and D for different fixed quantization parameters (Q). A set of rate-distortion curves with one curve for each Q is thus obtained. The slope of these curves at a particular (R, D) point determines the value of $\lambda$. The optimum rate-distortion relationship is obtained by taking the minimum of the rate-distortion curves and, in turn, generating an approximate relationship between $\lambda$ and Q.

A practical rate-distortion optimization process then uses the approximate relationship between $\lambda$ and Q to select $\lambda$ and involves an exhaustive calculation of all feasible modes to determine the bits and distortion of each mode. The process then evaluates a Lagrangian metric $(D+\lambda R)$ that considers both bit rate and distortion, and selects the mode that minimizes this metric. The resulting bit rate R may violate the limits on desired bit rate, thus, necessitating the use of a rate controller. The usual way to control the bit rate is to vary Q from pixel block to pixel block and, in the case of buffer overflow or underflow, to increase or decrease Q accordingly.

Despite the above simplifications, the exhaustive selection of all feasible modes in rate-distortion optimization presents a major hurdle in the implementation of H.264/AVC compliant encoders, particularly in real-time load constrained environments. This fact is very significant in consumer electronics where the success of a system depends largely on its cost competitiveness, and where DSPs (digital signal processors) and other devices having low or limited computing power are frequently used. In addition to this, the rate-distortion optimization algorithm of the H.264/AVC reference software does not consider the behavior of HVS to distortions of different types. This is an important omission as more emphasis needs to be given to distortions that are easily detected by human eye and less emphasis to those that are not easy to perceive. By distributing the available bits to different parts of the image judiciously and by taking into consideration the behavior of HVS, higher quality encoded video can be generated.

Hence, it would be desirable to provide methods and systems that are capable of providing, amongst other things, a low cost and efficient operational encoder control structure that can be deployed in H.264/AVC based systems.

SUMMARY

The present invention relates to methods and systems that may be used to reduce the computational complexity of encoder control, provide accurate control over bit rate, and reduce distortion artifacts on the basis of HVS characteristics.

In one aspect, the present invention discloses an efficient and computationally less demanding framework for robust operational control of video encoders. One focus of the present invention is on real-time single-pass H.264/AVC encoding on DSPs and other devices having limited computing power. However, the present invention can be easily adapted to operate in a non real-time encoding scenario, can be made part of a multi-pass encoding scheme, and can be used for controlling video encoders complying with other video standards (such as, MPEG1, MPEG2, MPEG4, H.263 etc.) as well. Furthermore, the present invention can be used in constant bit rate (CBR) or variable bit rate (VBR) encoding systems. In one embodiment, the framework comprises a two-layer architecture that effectively decouples the processes of video bit rate control and video distortion control. The upper layer includes a video bit rate controller that operates on a single picture/picture-slice, or a number of pictures/picture-slices, and is based on feedback control techniques used in automatic control systems. From the perspective of rate control, the video encoder is treated as a dynamic system, and the adoption of feedback techniques transforms the rate control problem into a typical control systems problem. A number of adaptive and non-adaptive controllers (with and without rate-quantizer models) can therefore be used in the encoder control framework to provide correct quantization parameters for accurate rate control. In addition, encoder buffer management can be easily integrated into the upper layer rate controller allowing relaxation or tightening of the control effort on the basis of encoder buffer state. Different picture/slice level decisions (like picture/slice type selection etc.) can also be made part of the upper layer rate controller.

The lower layer of the framework includes a video quality/distortion controller that operates at the level of blocks of pixels, and reduces distortion artifacts. This lower layer controls the selection of pixel-block quantization parameters, pixel-block modes, pixel-block partitions, and motion vectors. Because of the decoupled nature of the encoder control architecture of the present invention, there is flexibility with respect to combining various feedback controllers and distortion reduction schemes. Distortion control can therefore be achieved on the basis of a HVS based scheme or by R-D optimization methods. In the context of rate control, any variation in the bit rate due to the lower layer can be treated as a disturbance, and can be effectively absorbed by the upper layer rate controller. Once the upper layer rate controller is properly tuned and functioning, effort can be focused on distortion minimization within the set of constraints imposed by the encoder buffer. This divide-and-conquer strategy makes the task of encoder operational control a lot easier.

In another aspect, the present invention discloses an efficient bit rate controller that serves as the upper layer of the operational control architecture, and is based on the proportional-integral-derivative (PID) technique used in automatic control systems. The upper layer includes a PID controller. The proportional, integral and derivative gains (Kp, Ki, Kv) of the PID controller can be easily tuned to accurately handle a multitude of video coding scenarios and bit rates, ranging from the simple low bit rate video conferencing to the complex high bit rate DVD quality video. The PID controller relies on feedback of simple data like the number of encoded bits in the previous picture(s) or the current bit rate, and does not require rate-distortion modeling. The PID controller directly outputs increments to previous quantizer values ($\Delta Q$) to form an estimate for the next quantizer Q of the next picture/picture-slice, or the next set of pictures/picture-slices. The variation in the value of Q can be limited on the basis of quality considerations and/or buffer constraints, and the resulting Q can be used in picture/slice encoding. The PID controller can be used in real-time or non-real-time encoding scenarios, and can handle CBR and VBR encoding modes. Furthermore, the PID controller can be used as a single pass rate controller or made a part of a multi-pass encoding scheme.

In yet another aspect, the present invention discloses a simple and effective video quality/distortion controller that serves as the lower layer of the operational control architecture. In one embodiment, the quality/distortion controller of the present invention controls the selection of pixel block modes, pixel block partitions, pixel block quantizers, and motion vectors. Such selection is based upon factors that directly influence the human visual system (HVS). These factors include, for example, complexity of texture, brightness of scene content, relative motion, and noise level etc. The quality/distortion controller relies on very simple image distortion metrics, such as, the sum of absolute difference (SAD) and the gradient of SAD. Its computational requirements are therefore much lower than rate-distortion optimization techniques. The computational requirements of the quality/distortion controller can be further reduced by using sparse pixel values, sub-sampled, or scaled down images. The quality/distortion controller generates results comparable to the elegant but cumbersome R-D optimization methods at a very low cost, and is therefore very suitable for systems with limited computing power.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
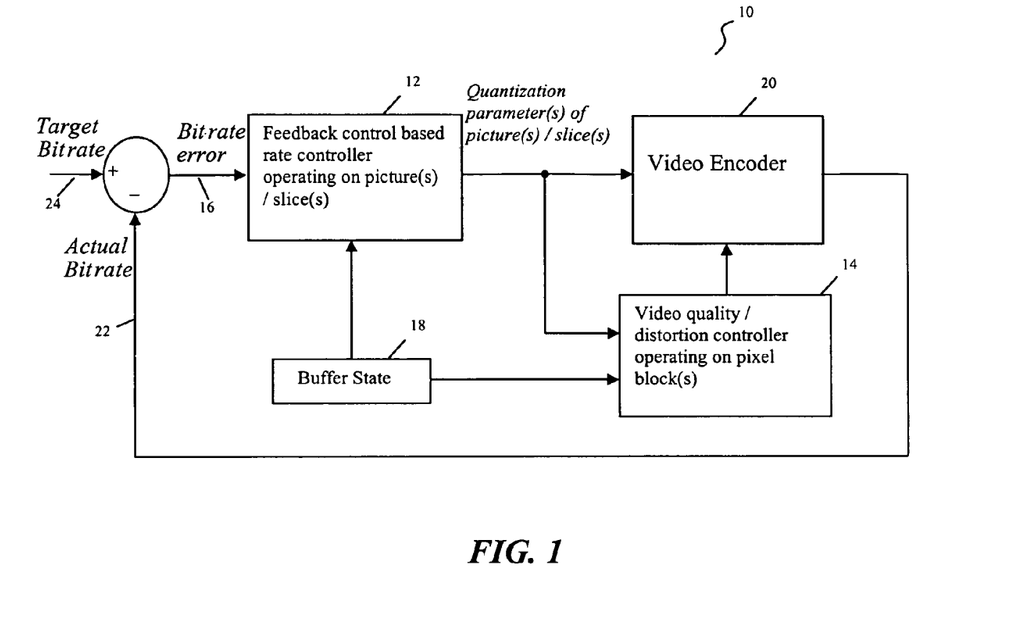
FIG. 1 is a simplified schematic diagram illustrating an operational control framework for video encoders according to one embodiment of the present invention.

One or more embodiments of the present invention will now be described. FIG. 1 depicts in simplified form the operational control framework 10 for use in video encoding according to one embodiment of the present invention. The overall process is effectively converted into a feedback control system with an upper layer feedback-based rate controller 12 operating at picture(s)/slices(s) level, and a lower layer quality/distortion controller 14 operating at pixel block level. Respective outputs from the upper layer feedback-based rate controller 12 and the lower layer quality/distortion controller 14 are provided to a video encoder 20 for processing. As will be apparent to one skilled in the art of feedback control systems, the data representing bit rate error 16 that is used by the upper layer feedback-based controller 12 may vary depending upon the nature and type of the feedback algorithm. An encoder buffer state 18 is used as input in both the upper layer feedback-based rate controller 12 and the lower layer quality/distortion controller 14 to prevent possible overflow and underflow conditions. The deviation in the actual bit rate 22 from the target bit rate 24 that occurs due to the action of the lower layer quality/distortion controller 14 is compensated by the feedback action of the upper layer feedback-based rate controller 12. A variety of powerful feedback-based (adaptive and non-adaptive) rate controllers and quality/distortion controllers with corresponding algorithms can be plugged into the framework 10 of FIG. 1. A salient feature of the arrangement of FIG. 1 is the effective decoupling between the bit rate and quality/distortion controls, whereby the lower layer quality/distortion controller 14 focuses on minimizing the distortion of pixel blocks, and the upper layer feedback-based rate controller 12 adjusts the overall bit rate.

Figure 2:
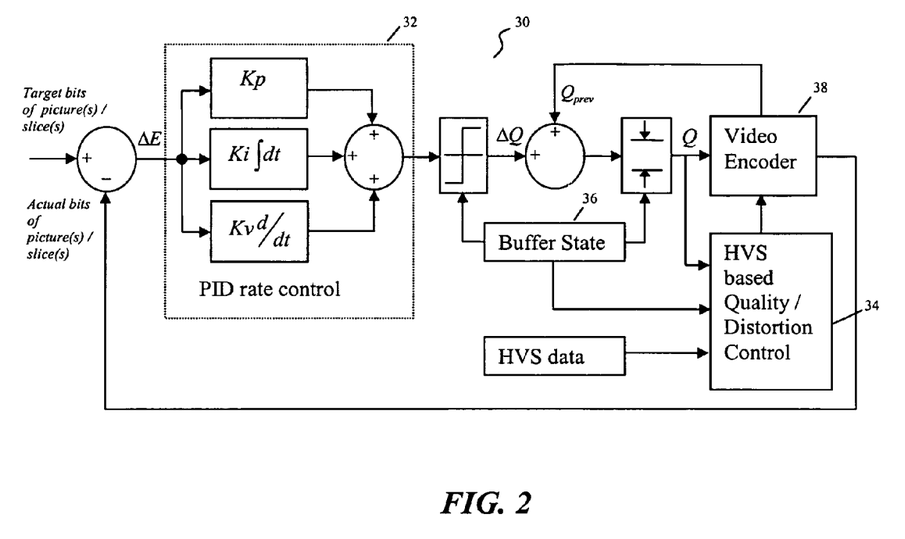
FIG. 2 is a simplified schematic diagram illustrating an operational control framework for video encoders with PID control-based rate controller and HVS data-based quality controller according to one embodiment of the present invention.

FIG. 2 shows in simplified form an embodiment of the operational control framework 30 of the present invention. In this embodiment, the bit rate is controlled by a fixed gain PID controller 32, and the quality/distortion is controlled by a HVS data-based controller 34. The PID controller 32 integrates and differentiates the error signal, multiplies the resultant signals with suitable gains (Kp, Kv, and Ki), and adds up the results. The output of the PID controller 32 is suitably clipped on the basis of the current buffer state 36 to form a differential quantizer signal. The differential quantizer signal is added to the existing quantizer and range-clipped to form the estimate of next quantizer Q to be used for encoding the next picture(s)/slice(s). It is worth noting that the gains of the PID controller 32 (Kp, Kv, and Ki) depend upon the motion estimation strategy and other video coding parameters of the video encoder 38. In one embodiment, these gains are selected on the basis of tests performed on a comprehensive set of video sequences. Alternatively, the gains may be variable and adjustable during operation. It should be noted and emphasized that the PID controller 32 may appear in many different forms and the simplified diagram of FIG. 2 serves only as an illustration.

Figure 3:
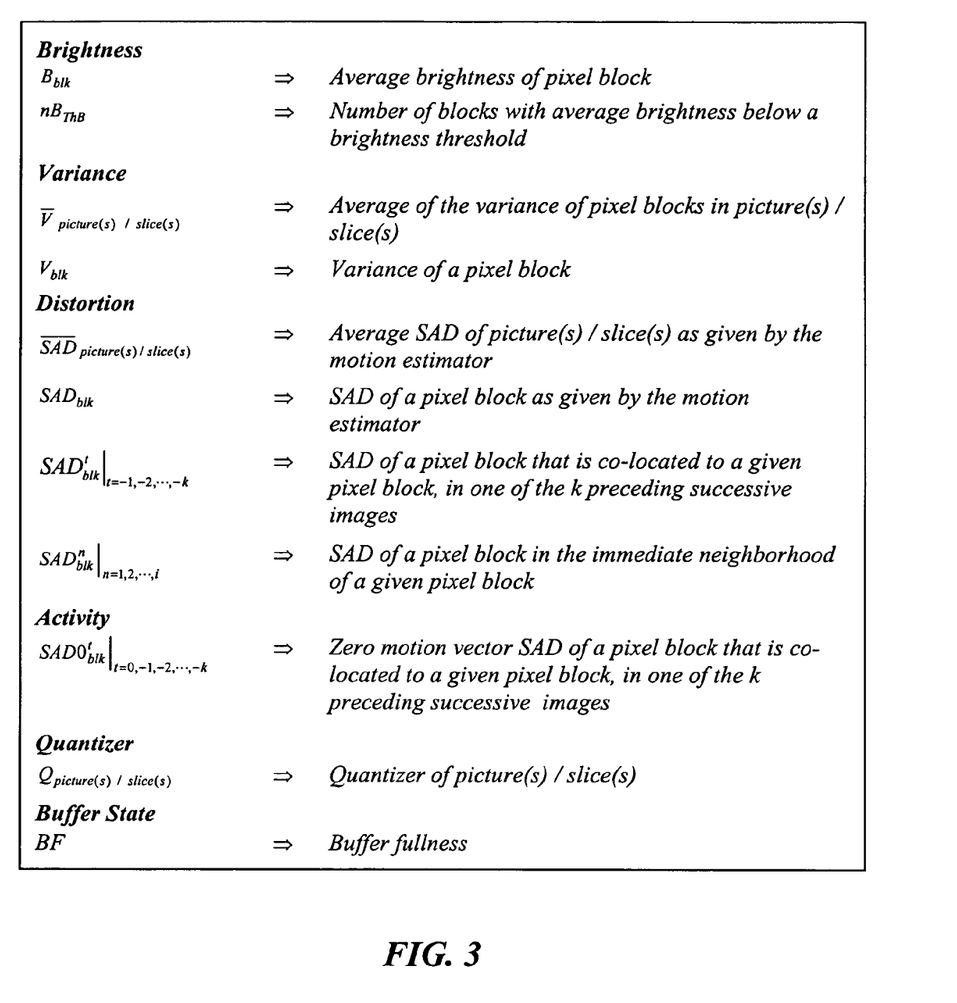
FIG. 3 is a table illustrating the inputs of the quality/distortion controller according to one embodiment of the present invention.
Figure 4:
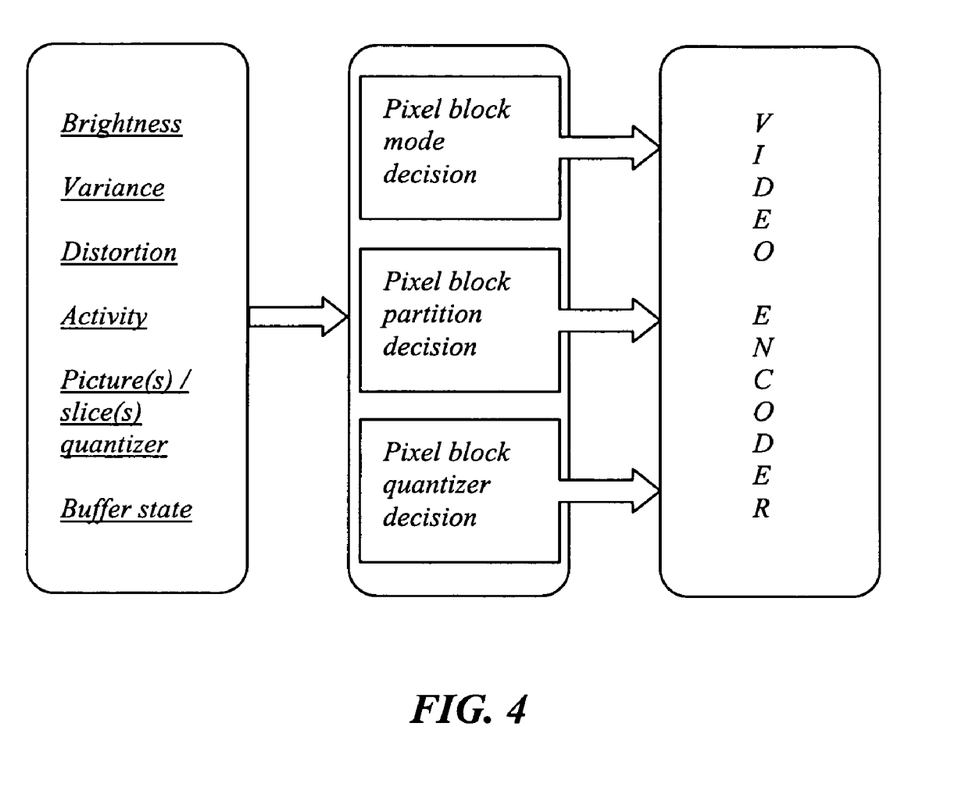
FIG. 4 is a simplified schematic diagram illustrating a quality/distortion controller overview according to one embodiment of the present invention.
Figure 5:
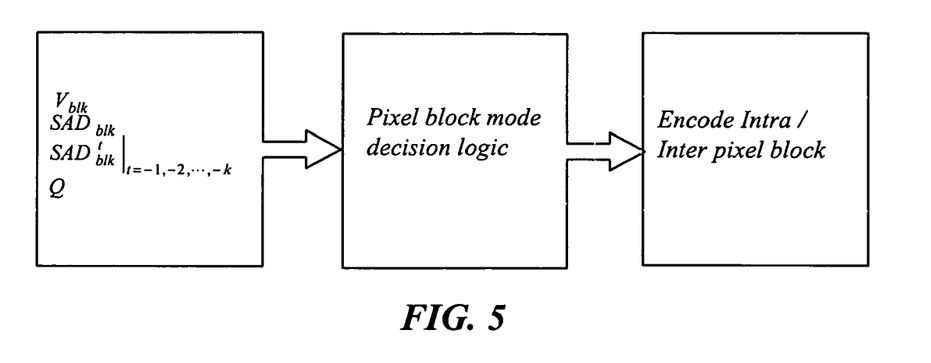
FIG. 5 is a flow diagram illustrating a pixel block mode decision process overview according to one embodiment of the present invention.
Figure 6:
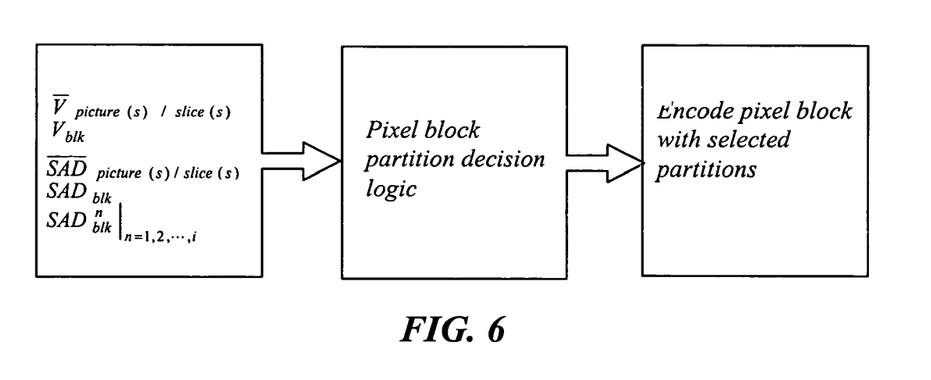
FIG. 6 is a flow diagram illustrating a pixel block partition decision process overview according to one embodiment of the present invention.
Figure 7:
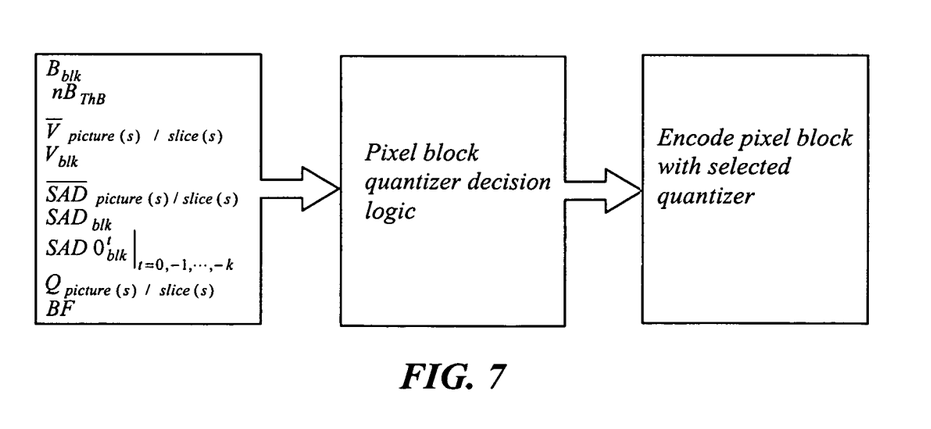
FIG. 7 is a flow diagram illustrating a pixel block quantizer selection process overview according to one embodiment of the present invention.

The lower layer quality/distortion controller 34 of FIG. 2 is based upon the data that directly influences the behavior of HVS and does not rely on rate distortion optimization techniques. The inputs to the quality/distortion controller 34 include, for example, brightness data, variance data, distortion metrics, activity metrics, picture(s)/slice(s) quantizer, and buffer state. It should be noted that any brightness, variance, distortion, and activity representations may be used. Some illustrative definitions of the inputs of the quality/distortion controller 34 are given in FIG. 3. The quality/distortion controller 34 operates on a pixel block level and selects appropriate values of pixel block modes and pixel block partitions, and refines the picture(s)/slice(s) quantizers to obtain appropriate pixel block quantizers. A general overview about the operation of the quality/distortion controller 34 in one embodiment of the present invention is illustrated in FIG. 4. The various pixel block level decisions taken by the quality/distortion controller 34 of the present invention are shown separately alongside their respective inputs in FIGS. 5-7.

Figure 8:
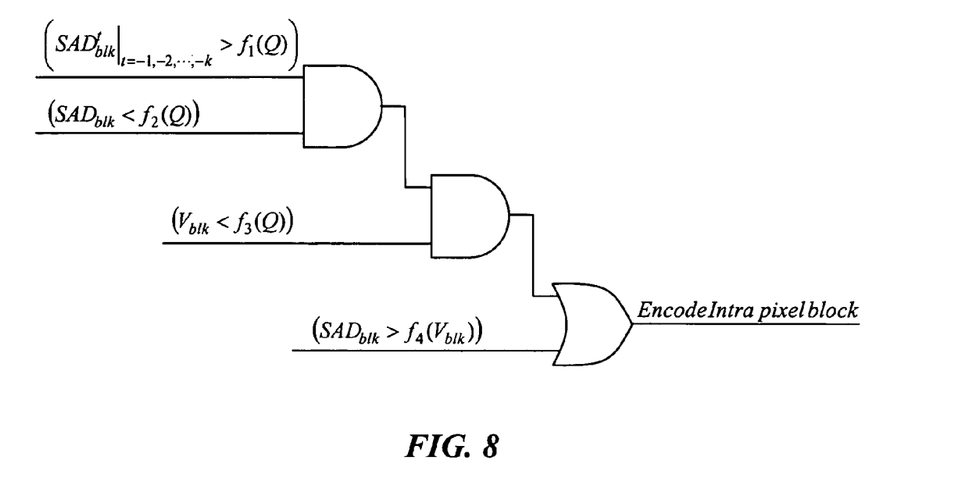
FIG. 8 is a simplified schematic diagram illustrating a pixel block mode decision process details according to one embodiment of the present invention.
Figure 9:
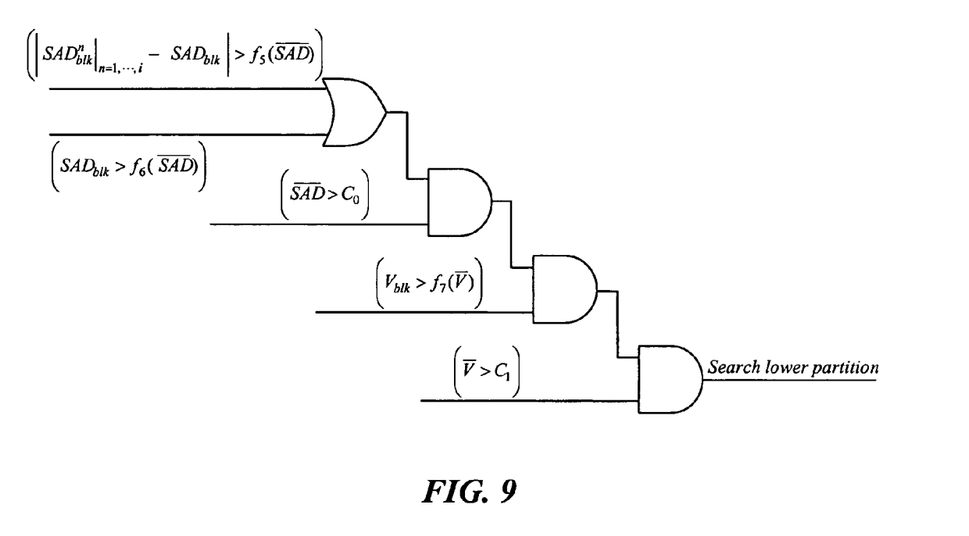
FIG. 9 is a simplified schematic diagram illustrating a pixel block partition decision process details according to one embodiment of the present invention.
Figure 10:
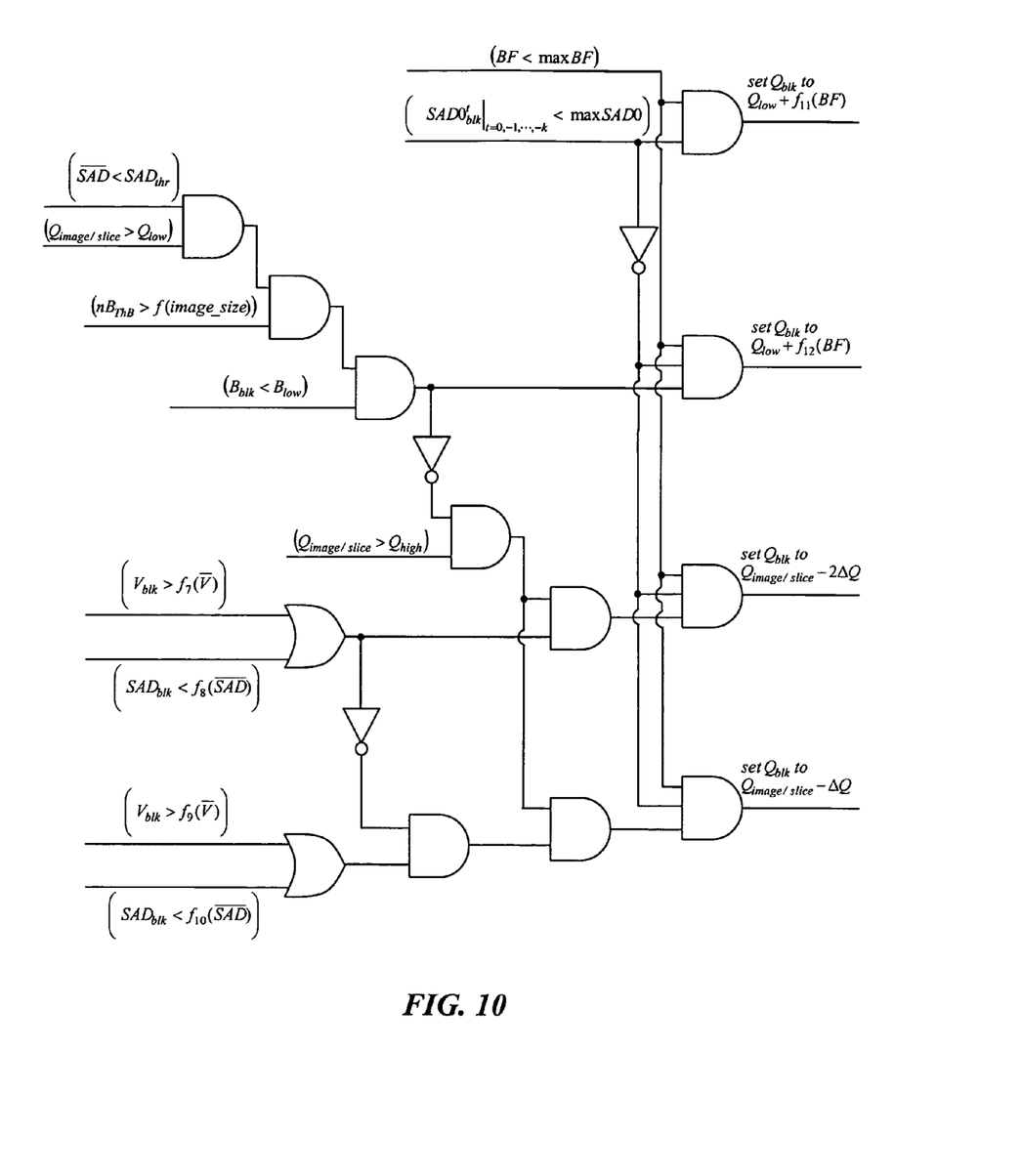
FIG. 10 is a simplified schematic diagram illustrating a pixel block quantizer selection process details according to one embodiment of the present invention.

Additional details about the various pixel block level decisions taken by the quality/distortion controller 34 in one embodiment of the present invention are shown separately alongside their respective inputs and outputs in FIGS. 8-10. The decision making processes in FIGS. 8-10 are shown using simple Boolean logic. The inputs to these processes are binary decisions based upon comparisons of the input data with different predetermined functions of the input data and predefined constants. The predetermined functions of the input data ($f_i(-)$) are typically linear or piecewise linear relationships of the input variables, and are determined experimentally on a comprehensive test suite of video sequences. These functions are dependent upon the encoder parameters, e.g., the motion estimator, and vary for encoders complying with different video standards. In a similar fashion, the predefined constants used in the comparison process are determined through prior experimentation.

The output of FIG. 8 is a binary decision to encode a pixel block in Intra mode (when true) or in Inter mode (when false).

The output of FIG. 9 is another binary value that decides whether a large partition size is good enough (when false) or a search on a lower partition grid is needed (when true) for efficient encoding.

FIG. 10 has multiple mutually exclusive binary outputs that determine the range of pixel block quantizers under different operating conditions. In FIG. 10, starting from above, the first output handles the low activity regions of an image; the second output handles the darker and noisier regions of an image; while the third and the fourth outputs handle the high textured and poorly predicted regions.

Once the functions $f_i(-)$ and the constants are determined, their usage for quality/distortion control is extremely effective and cheap. The overall idea is to make use of a rich set of HVS related data to build simple predefined relationships experimentally, and use these relationships to make decisions that minimize video encoding artifacts. Since the data used in the decision making process directly affects HVS behavior, it is easy to put more emphasis on distortions that are easily detected by human eye and less emphasis on those that are difficult to perceive. The HVS based quality/distortion controller 34 of the present invention is very appropriate for implementations on limited computing power devices that cannot afford to use the computationally expensive rate-distortion optimization techniques, and generates video quality that is virtually identical to these techniques. This is especially true for the H.264 (ISO/IEC 14496-10) encoders where the computational requirements are extremely high. In addition to the H.264/AVC standard, it should be noted that the present invention may also be used with other video coding standards, such as, VC-1, MPEG-4, MPEG-2, MPEG-1, H.263, amongst others.

It must be pointed out that, based on the disclosure and teachings provided herein, there can be numerous software and/or hardware implementations of the decision-making logic processes. The decision-making logic processes as illustrated herein are merely examples, and as such all the other different implementations of the decision-making logic processes fall within the scope of the present invention.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A system comprising:
   a bit rate controller configured to generate at least one picture/slice quantization parameter based on a feedback control technique, wherein the feedback control technique utilizes at least one of a proportional-integral-derivative (PID) controller, an adaptive controller and a non-adaptive controller;
   a quality/distortion controller configured to at least one quality/distortion control signal that controls the selection of at least one of a pixel-block quantization parameter, pixel-block encoding mode and pixel-block partition; and
   a video encoder configured to (i) receive the at least one picture/slice quantization parameter and the at least one quality/distortion control signal and (ii) generate encoded video data.

2. The system of claim 1 wherein the system is implemented in software or hardware or a combination of both.

3. The system of claim 1 wherein the PID controller has fixed gains and operates in accordance with the feedback control technique, and wherein values of the fixed gains are predetermined.

4. The system of claim 1 wherein the PID controller has variable gains and operates in accordance with the feedback control technique, and wherein values of the variable gains are updated during operation of the PID controller.

5. The system of claim 1 further comprising a video encoder buffer, wherein state information with respect to the video encoder buffer is used to control the bit rate controller in order to prevent one or more of buffer overflow and underflow.

6. The system of claim 1 wherein information with respect to selection of picture/slice types is used to control the bit rate controller.

7. The system of claim 1 wherein the bit rate controller is further configured to operate within a single pass video encoding system or a multiple pass video encoding system.

8. The system of claim 1 wherein the video encoder is further configured to encode on a real-time or non-real-time basis and generate data streams at a constant bit rate or at a variable bit rate.

9. The system of claim 1 wherein the quality/distortion controller is further configured to receive data that influences a human visual system (HVS), the data including a measure of at least one of a brightness, variance, distortion, and motion activity in at least one pixel block.

10. The system of claim 1 wherein the measure is obtained from at least one a video image, a scaled-down version of the video image, and a sub-sampled version of the video image.

11. The system of claim 1 further comprising a video encoder buffer, wherein state information with respect to the video encoder buffer is used to control the quality/distortion controller in order to prevent one or more of buffer overflow and underflow.

12. The system of claim 1 wherein the quality/distortion controller is further configured to handle one or more processes including a pixel block mode selection process, pixel block partition selection process, and a pixel block quantizer selection process; and
   wherein the one or more processes involve a plurality of comparisons between data that influences a human visual system (HVS) and a plurality of constants and functions.

13. The system of claim 12 wherein the plurality of constants and functions used in the comparisons are predetermined.

14. The system of claim 12 wherein the one or more processes are handled on a binary decision basis.

15. The system of claim 1 wherein the video encoder is compliant with at least one video coding standard including H.264/AVC, VC-1, MPEG-4, MPEG-2, MPEG-1 and H.263.

16. The system of claim 1 wherein the quality/distortion controller is based upon a rate-distortion (RD) optimization method.

17. The system of claim 1 wherein the bit rate controller and the quality/distortion controller are decoupled from one another.

18. The system of claim 1 wherein the bit rate controller operates at a picture/slice level.

19. The system of claim 1 wherein the quality/distortion controller operates at a pixel block level.

* * * * *